G. A. RYAN.
TIRE TIGHTENER.
APPLICATION FILED MAY 8, 1909.
949,663.
Patented Feb. 15, 1910.
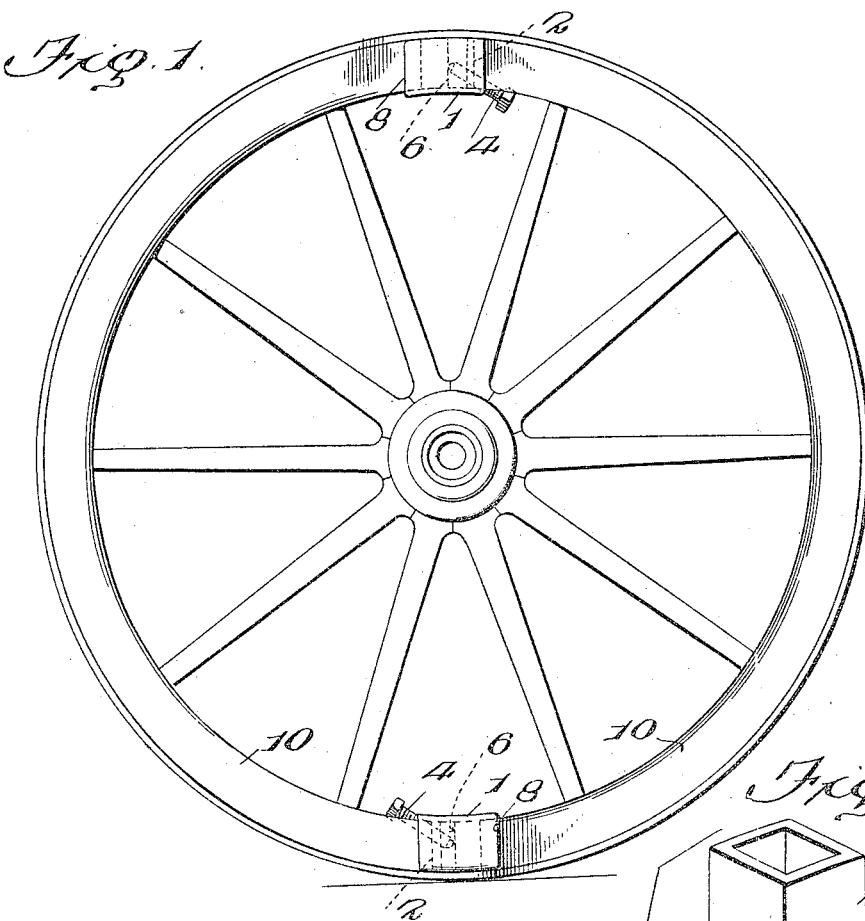
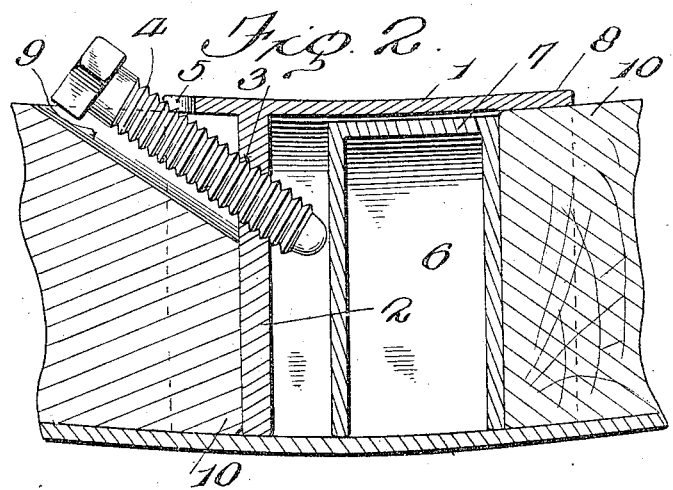
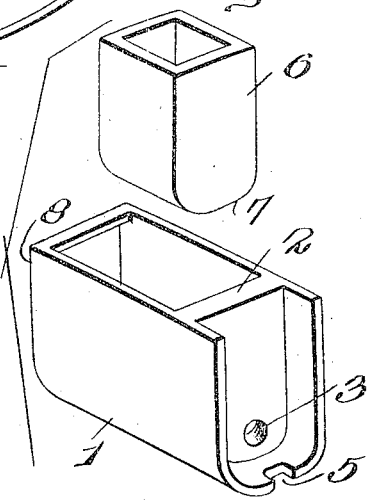
Witnesses
R. P. Duffie
A. M. Murphy.
Inventor
G. A. Ryan
By John S. Duffie
Attorney

UNITED STATES PATENT OFFICE.

GEORGE A. RYAN, OF AMARILLO, TEXAS.

TIRE-TIGHTENER.

949,663.

Specification of Letters Patent.  Patented Feb. 15, 1910.

Application filed May 8, 1909. Serial No. 494,830.

*To all whom it may concern:*

Be it known that I, GEORGE A. RYAN, a citizen of the United States, residing at Amarillo, in the county of Potter and State of Texas, have invented certain new and useful Improvements in Tire-Tighteners, of which the following is a specification.

My invention has relation to tire tighteners, its main object being to enable a wagoner to place the required tension upon the felly of a wheel to hold the tire thereof rigidly against the outer surface of said felly.

It is commonly known that the metal tire of a wheel, due to the constant pressure upon it, gradually expands until it becomes loose upon the wheel, which it protects.

With the aid of this invention the tension upon said tire may be increased in proportion to the amount of the expansion of the metal. Therefore it is obvious that the life of a tire upon a wheel embodying my invention, will be much longer in duration than if my device were not employed.

With these and other objects in view my invention consists of the novel construction and arrangement of parts as are hereinafter described in this specification, and illustrated in the accompanying drawings, which are not drawn to any particular scale, and pointed out in the appended claim.

Referring to the drawings: Figure 1 is an elevation of a wheel embodying my invention. Fig. 2 is a central, vertical, segmental, sectional view of Fig. 1. Fig. 3 are details.

My invention is described as follows: A housing 1 which has a U-shaped cross section is provided with a partition 2 near one of its ends. Said partition is provided with a threaded perforation 3 for the passage of a set screw 4. A notch 5 is cut in the outer end of said housing near the center thereof to allow for the adjustment of said set screw 4. A recess 9 is cut in the felly 10 to accommodate the said screw. A block 6 whose lower end 7 is curved to conform to the inner surface of said housing 1, has a cross section which is substantially rectangular. Said block is adapted to be adjusted at any point between said partition 2 and the end 8 of said housing 1. A sufficient segment is cut out of said felly at two oppositely disposed points leaving a gap of sufficient width for the reception of said block.

It will be seen that in order to make my device practical it is necessary to cause said set screw 4 to take a downwardly slanting course so that its outer end may be easily manipulated. Its inner end plays against the inner wall of said block. One or more of these devices may be employed for each wheel, but, however, it is thought that two will be most satisfactory, as illustrated in Fig. 1.

Although I have specifically described the construction of this invention, yet I may exercise the right to make such modifications or alterations therein as do not depart from the spirit of the claim hereunto appended and which will be obviously necessary in the manufacture and development thereof.

What I claim as new is:

In a tire tightener the combination with a block of a housing, said block having a substantially rectangular cross section, the cross section of said housing being U-shaped, a partition formed in said housing near one of its ends, a set screw passing through said housing slantingly, its inner end playing against said block, substantially as described.

In testimony whereof I affix my signature, in presence of two witnesses.

GEORGE A. RYAN.

Witnesses:
 WADE WILLIS,
 J. B. MARTIN.